Jan. 17, 1956  R. POESCHL ET AL  2,731,222
ROCKERS

Filed Jan. 23, 1952  3 Sheets-Sheet 1

INVENTORS:
Rudolf Poeschl
Wilhelm Poeschl
BY Singer, Stern & Carlberg
Attorneys.

Jan. 17, 1956   R. POESCHL ET AL   2,731,222
ROCKERS

Filed Jan. 23, 1952   3 Sheets-Sheet 2

INVENTORS:
Rudolf Poeschl
Wilhelm Poeschl
BY Singer, Stern & Carlberg
Attorneys

Jan. 17, 1956  R. POESCHL ET AL  2,731,222
ROCKERS
Filed Jan. 23, 1952  3 Sheets-Sheet 3

INVENTORS:
Rudolf Poeschl
Wilhelm Poeschl,
BY Singer, Stern & Carlberg
Attorneys.

United States Patent Office 2,731,222
Patented Jan. 17, 1956

2,731,222

ROCKERS

Rudolf Poeschl, Vienna, and Wilhelm Poeschl, Rohrbach, Austria

Application January 23, 1952, Serial No. 267,880

5 Claims. (Cl. 248—23)

This invention relates to a rocker for the pivotal support of machines, particularly of electric motors or generators, to utilize the reaction torque for the adjustment of the belt tension. To achieve in rockers of this type a particularly favourable function in all conditions of operation, and to avoid with safety on the one hand an excessive tensioning of the belt and on the other hand a slippage of the belt, the pivot of the rocker must have a certain relation to the dimensions of the motor, particularly of the motor belt pulley. In this connection the arrangement of the belt and the position of the axis of symmetry of the belt relative to the rocker must also be taken into consideration.

The manufacture of special rockers for each type of motor and for each mode of operation is expensive. For this reason the need has been felt in practice, in particular in connection with rocking supports for motors of small power, to provide rockers which, being usable universally, may be used without structural alterations within a wide power range for motors of different sizes and types of construction, and which also permit of a certain adaptation of the rocker support to variable conditions of operation. In this manner it is possible to save in the manufacture of the rocker as well as in the stocking of parts, etc. The adaptability of the rocker to the conditions of operation has a significance which is not to be underestimated.

Rocker constructions have been suggested providing for a certain adjustment of the pivotal supporting means in the arms of the rocker to permit of a variation of the position of the pivotal axis within certain limits. However, the size of the rocker arms sets a limit to the thus achieved adjustability of the pivotal axis and involves either an adjusting range which is not always sufficient, or excessively heavy and bulky rocker arms.

The invention provides, for the pivotal support of machines, a rocker in which the adjusting range of the pivotal axis is enlarged to provide for a universal adaptability of the rocker to various types of machines and operating conditions by the fact that those parts of the rocker which form the machine support, and the rocker arms receiving the pivotal supporting members, are relatively angularly movable and may be interconnected firmly in different relative angular positions by fixing members. Moreover, in accordance with the invention, the spacing of the pivotal supporting members, e. g., of the pivot pins, at the rocker arms, from the axis about which the parts forming the machine support and the arms of the rocker are relatively angularly movable, is selectively variable, preferably by the provision of several bearing holes or slots in the rocker arms.

In this manner it is possible, on the one hand, to arrange the pivotal axis of the rocker, being determined by the pivot pins or the like, in different heights at the rocker arms, whereas on the other hand, by an additional angular adjustment of the machine with the machine support, relative to the rocker arms, the position of the pivotal axis relative to the motor may be determined. The combination of these two adjustments provides for a universal adjustment within widest limits to meet all requirements of practical operation.

In a preferred embodiment of the invention the machine support is connected to the rocker arms through a tube, to which the machine support and/or the rocker arms are pivotally connected and fixable in different positions. Such a construction provides in a simple manner for the relative angular movement and fixation of the rocker arms and the machine support. Moreover, the risk of the belt rubbing on the otherwise conventional bottom of the rocker is avoided because the width of the tube replacing the bottom is small. This construction of the rocker provides for sufficient space for the belt and for motors or generators equipped with ring-oiling bearings, e. g., which may be moved only slightly out of the horizontal position, to be pivotally supported even where the belt direction is horizontal or almost horizontal.

The tube connecting the rocker arms with the machine support, however, also enables a particularly simple mounting of a vibration or shock damper to damp the pivotal motion of the machine. The elimination of the rocker bottom provides the space for the damper which may be linked directly to the tube, said tube providing the pivotal axis for the damper.

In the accompanying drawings the invention is illustrated diagrammatically in an embodiment shown by way of example.

Figure 1:
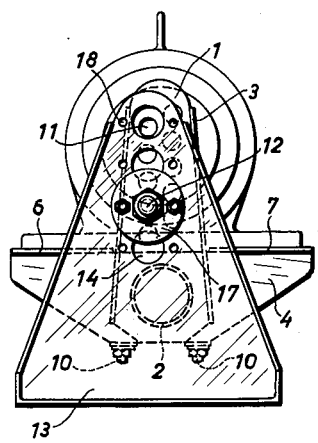
Figs. 1 and 2 are end and side elevations, respectively, showing a rocker and a motor.
Figure 2:
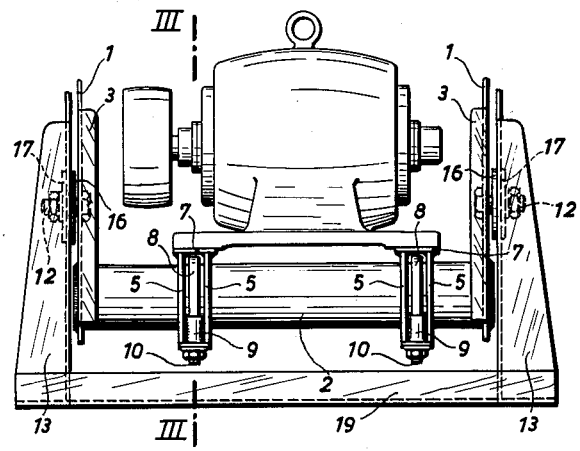
Figure 3:
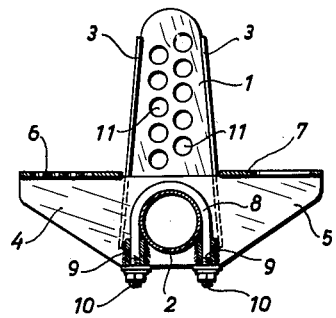
Fig. 3 is a sectional view of the rocker, taken along line III—III of Fig. 2.
Figure 4:
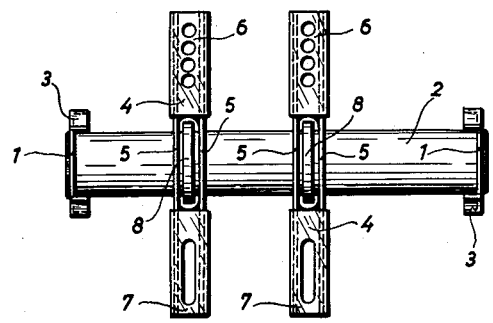
Fig. 4 is a top plan view of the rocker.

The rocker comprises two rocker arms 1, which are connected to a tube 2 by welding. The rocker arms are stiffened at their edges by sheet metal members 3 welded thereto. The machine support consists of two blocks 4, each of which is formed by two plates 5, connected by cover plates 6 and 7 welded thereto to form a downwardly open channel section. The plates 5 have holes therein for the passage of the tube 2. A U-shaped bail 8 embracing the tube 2 and having its ends extending through tubular members 9 fixed by welding between the plates 5, enables the clamping of each block 4 to the tube 2 by a tightening of the screw nuts 10.

The cover plates 6 have several holes therein, and the cover plates 7 have a slot so that motors of different sizes may be clamped on the blocks. Owing to the fact that the blocks 4 may be displaced on the tube 2 also in the axial direction thereof, the axial spacing of the feet of the motor can also be allowed for. Thus, this construction of the blocks enables, on the one hand, the clamping of different types of motors on the same rocker, and, on the other hand, the fixation of the motor support, formed by the blocks, to the tube 2, in any desired angular position relative to the rocker arms 1.

Figure 5:
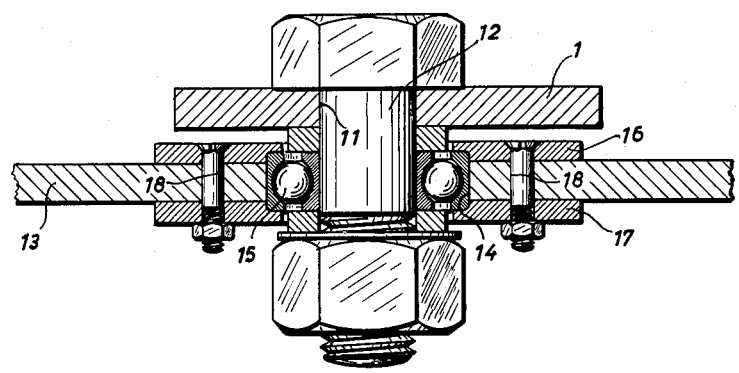
Fig. 5 shows on a larger scale a detail of the pivotal support.

The rocker arms have several holes 11 therein, into which the pivot pins 12 (cf. Fig. 5) may be selectively inserted. The two side plates 13 of the rocker supports also have several holes 14 therein, which may be used selectively for mounting the rocker. A ball bearing 15 held by two plates 16 and 17 is inserted into the selected hole 14. The two plates 16 and 17 are strained against each other by screws extending through holes 18 in the rocker pedestal 13. In this manner the position of the pivotal axis may be adjusted as desired, on the one hand by the angular movement of the blocks 4, and on the other hand by the selection of the corresponding hole 11 so that all operating conditions may be taken into consideration and even in the case of different types of motors and different belt pulley sizes the most favourable position of the pivotal axis, approximately adjacent to the periphery of the belt pulley, may be chosen.

The relative angular movability of the machine support and rocker arms may be provided also by a rotatable connection of the rocker arms 1 to the cross member 2. Both possibilities of adjustment may be combined. Instead of the two blocks, a single supporting surface for the machine may be provided or a larger number of blocks may be arranged if this is necessitated by the construction of the machine.

Figure 12:
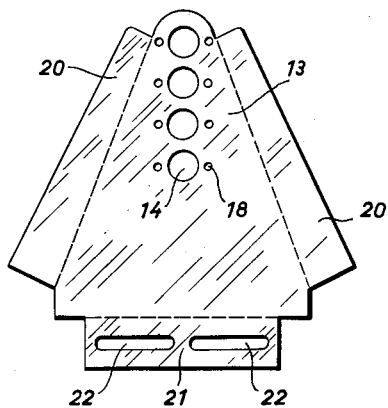
Fig. 12 shows a plate blank from which the rocker supports shown in Figs. 1 and 2 may be manufactured.

The rocker supports 13 are formed by bending from the plate blanks shown in Fig. 12. The bent lateral flanges 20 provide for rigidity, whereas the lower flange 21 has slots 22 to fix the support to the foundation. The flanges 20 and 21 are welded to angle irons 19, which interconnect the two rocker supports 13 to form a unit and which at the same time owing to their connection to the flanges 20 and 21 provide for rigid corners of the rocker supports.

Figure 13:
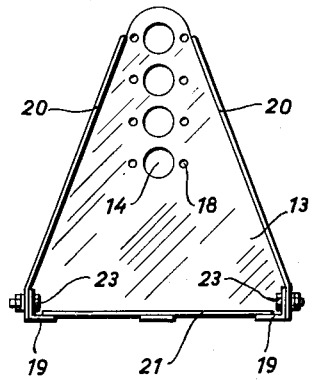
Fig. 13 shows a modification of the rocker supports.

The universal usability of the rocker supports 13 is provided thereby that the rocker supports, manufactured in quantities from the plate blanks shown in Fig. 12, may be connected by angle irons of different lengths, kept in stock in graded lengths, to adapt the rocker supports to machines of different lengths. As shown in Fig. 13 the angle irons may be connected to the flanges 20 and 21 also by screws 23. In this case the flanges 20 and 21 are simply extended correspondingly. Where such a screw connection is used the rocker supports may be adapted to the size of the machine on the spot.

Figure 6:
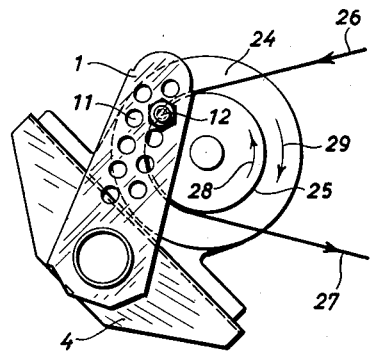
Figs. 6 to 11 illustrate diagrammatically different possible uses of the rocker according to the invention.
Figure 7:
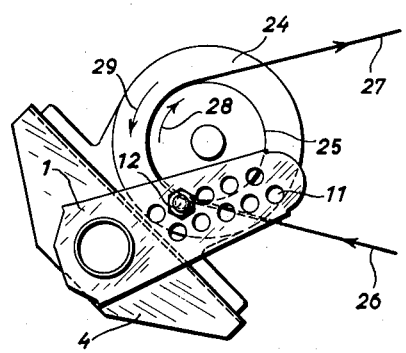

Figs. 6 to 11 show how by the selection of the bearing hole for the pivotal axis in the rocker arms, and by the angular movement of the rocker arms relative to the machine support, the rocker according to the invention may be adapted to the most various conditions of operation. Fig. 6 shows an inclined motor pulling the top strand, 24 being the motor, 4 the machine support of the rocker, 1 the rocker arm, and 11 the holes in the rocker arm to receive the pivot pin. 25 is the belt pulley, 26 the driving and 27 the driven strand of the belt. In this case the pivot pin 12 is arranged adjacent to the periphery of the belt pulley, above the axis of the rotor. The sense of rotation of the pulley belt is indicated by the arrow 28, the reaction torque on the stator by the arrow 29. Fig. 7 shows a motor of similar construction as in Fig. 6, e. g., of the ball bearing type, but arranged for pulling the lower strand. The several parts have the same reference characters as in Fig. 6.

Figure 8:
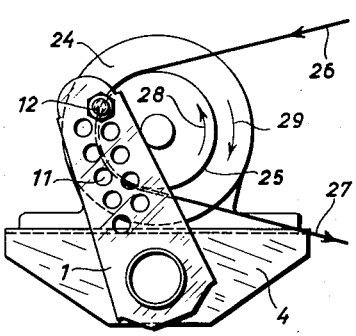
Figure 9:
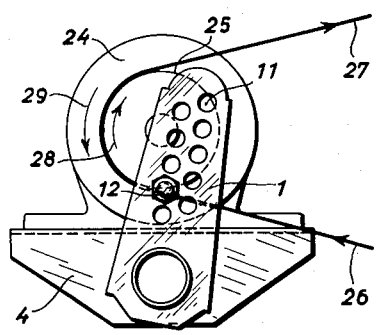
Figure 10:
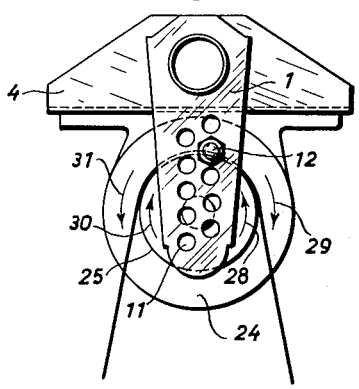
Figure 11:
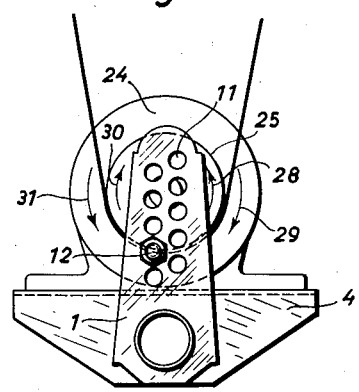

Figs. 8 and 9 show an upright motor, e. g., with ring oiling bearings, arranged for pulling the top strand and lower strand, respectively. By a corresponding arrangement of the pivot pin 12 and by an angular movement of the rocker arms 1 the rocker may be adapted to these operating conditions without difficulty. Fig. 10 illustrates the use of the rocker according to the present invention for a downwardly extending drive belt, both senses of rotation of the motor being permissible. The arrows 28 and 29 designate the sense of rotation of the belt pulley and the sense of the reaction torque, respectively, for the motor running in the counter-clockwise sense. The arrow 30 designates in Fig. 10 the opposite sense of rotation of the belt pulley, and the arrow 31 designates the reaction torque associated with this sense of rotation. The other parts of the motor and of the rocker are provided in this figure with the same reference characters as in the previous figures. Fig. 11 illustrates the operating conditions for an upwardly extending drive belt.

Figure 14:
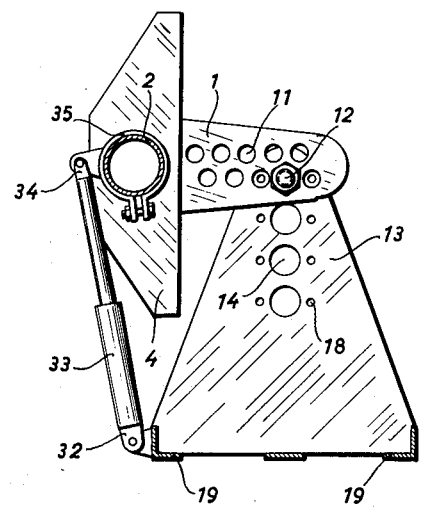
Figs. 14 and 15 show two arrangements of shock or vibration dampers in conjunction with a rocker as shown in Fig. 1.
Figure 15:
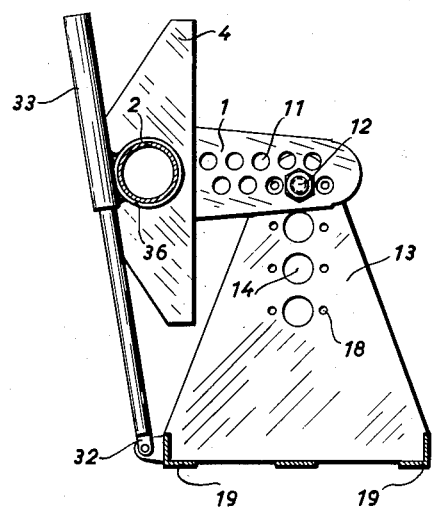

Fig. 14 illustrates the arrangement of a vibration damper. One end 32 of the telescopic damper 33 is linked to the angle iron 19, whereas the other end 34 of the damper is linked to a sleeve 35 clamped to the tube 2 of the rocker. The construction of the rocker with a tube enables a corresponding adjustment of the sleeve 35 so that the damper will function properly in every desired operating condition of the rocker. As shown in Fig. 15 the arrangement may be such that the tube 2 itself forms the pivotal axis for the damper 33', the latter comprising a sleeve 36 embracing the tube 2. Preferably the damper 33 or 33' is of the pneumatic type, which as compared to hydraulic dampers has the advantage that oil loss is precluded.

What we claim is:

1. In a support for a rotary machine, a mounting for said machine, side pieces at opposite sides of said mounting, means connecting said side pieces, adjustable means securing the mounting to said connecting means to vary the angular relation between said mounting and said side pieces, two spaced standards one adjacent one of said side pieces and the other adjacent the other of said side pieces, means pivotally connecting each of said side pieces to its adjacent standard, and means for changing the position of said pivot means in relation to said connecting means.

2. In a support for a rotary machine, a mounting for said machine, a cross member, a side piece at each end of said cross member, adjusting means securing the mounting to said cross member to vary the angular position of said machine mounting in relation to said side pieces, two spaced standards one adjacent one of said side pieces and the other adjacent the other of said side pieces, means pivotally connecting each of said side pieces to its adjacent standard, and means for changing the position of said pivot means in relation to the axis of said cross member.

3. In a support for a rotary machine, two blocks comprising a mounting for said machine, a cylindrical cross member embraced by said blocks whereby said mounting is turnable and slidable on said cross member, adjustable means on said blocks for clamping said mounting to said cross member in angularly and laterally adjustable positions, a side piece at each end of said cross member, two spaced standards one adjacent one of said side pieces and the other adjacent the other of said side pieces, means pivotally connecting each of said side pieces to its adjacent standard, and means for changing the position of said pivot means in relation to the axis of said cross member.

4. In a support for a rotary machine, two downwardly open channel members comprising a mounting for said machine, a cylindrical cross member, aligned apertures in the flanges of said channel members to receive said cylindrical cross member whereby said mounting is turnable and slidable on said cross member, adjustable bail means on said channel members for clamping said mounting to said cross member in angularly and laterally adjustable positions, a side piece at each end of said cross member, two spaced standards one adjacent one of said side pieces and the other adjacent the other of said side pieces, means pivotally connecting each of said side pieces to its adjacent standard, and means for changing the position of said pivot means in relation to the axis of said cross member.

5. In a support for a rotary machine, a mounting for said machine, side pieces at opposite sides of said mounting, means connecting said machine mounting to said side pieces, adjustable means securing the mounting to said connecting means to vary the angular relation between said mounting and said side pieces, two spaced standards one adjacent one of said side pieces and the other adjacent the other of said side pieces, means pivotally connecting each of said side pieces to its adjacent standard, and a plurality of holes in said side pieces for selectively receiving said pivot means, whereby the position of the axis of said pivot means can be changed in relation to said cross member.

References Cited in the file of this patent

UNITED STATES PATENTS

| | | |
|---|---|---|
| 768,392 | Moskowitz | Aug. 23, 1904 |
| 1,592,067 | Beetem | July 13, 1926 |
| 1,632,261 | Woodrow | June 14, 1927 |
| 1,725,824 | Parke et al. | Aug. 27, 1929 |
| 2,020,764 | Bradford | Nov. 12, 1935 |
| 2,024,127 | Coppock | Dec. 10, 1935 |
| 2,102,560 | Kimmich | Dec. 14, 1937 |
| 2,568,290 | Mountain et al. | Sept. 18, 1951 |

FOREIGN PATENTS

| | | |
|---|---|---|
| 164,928 | Austria | Dec. 27, 1949 |